United States Patent Office 3,463,610
Patented Aug. 26, 1969

3,463,610
PROCESS FOR THE PRODUCTION OF PARTICULATE TITANIUM DIOXIDE
James Dennis Groves, Redcar, and Kenneth Arkless, Eaglescliffe, England, assignors to British Titan Products Company Limited, Billingham, Durham, England, a corporation of the United Kingdom
Continuation-in-part of application Ser. No. 254,007, Jan. 25, 1963. This application May 11, 1966, Ser. No. 549,297
Claims priority, application Great Britain, Jan. 30, 1962, 3,528/62
Int. Cl. C01g 23/06; C09c 1/36
U.S. Cl. 23—202
16 Claims

ABSTRACT OF THE DISCLOSURE

Titanium dioxide in finely divided form is produced by effecting the reaction of a titanium tetrahalide in an oxygenating gas in the presence of a hot gaseous suspension containing dispersed metal oxide particles by effecting such reaction in a plurality of stages until the initial particles are coated to the desired degree and improved process and product result over that process in which all of the coating is effected in a single stage.

---

Figure 1:
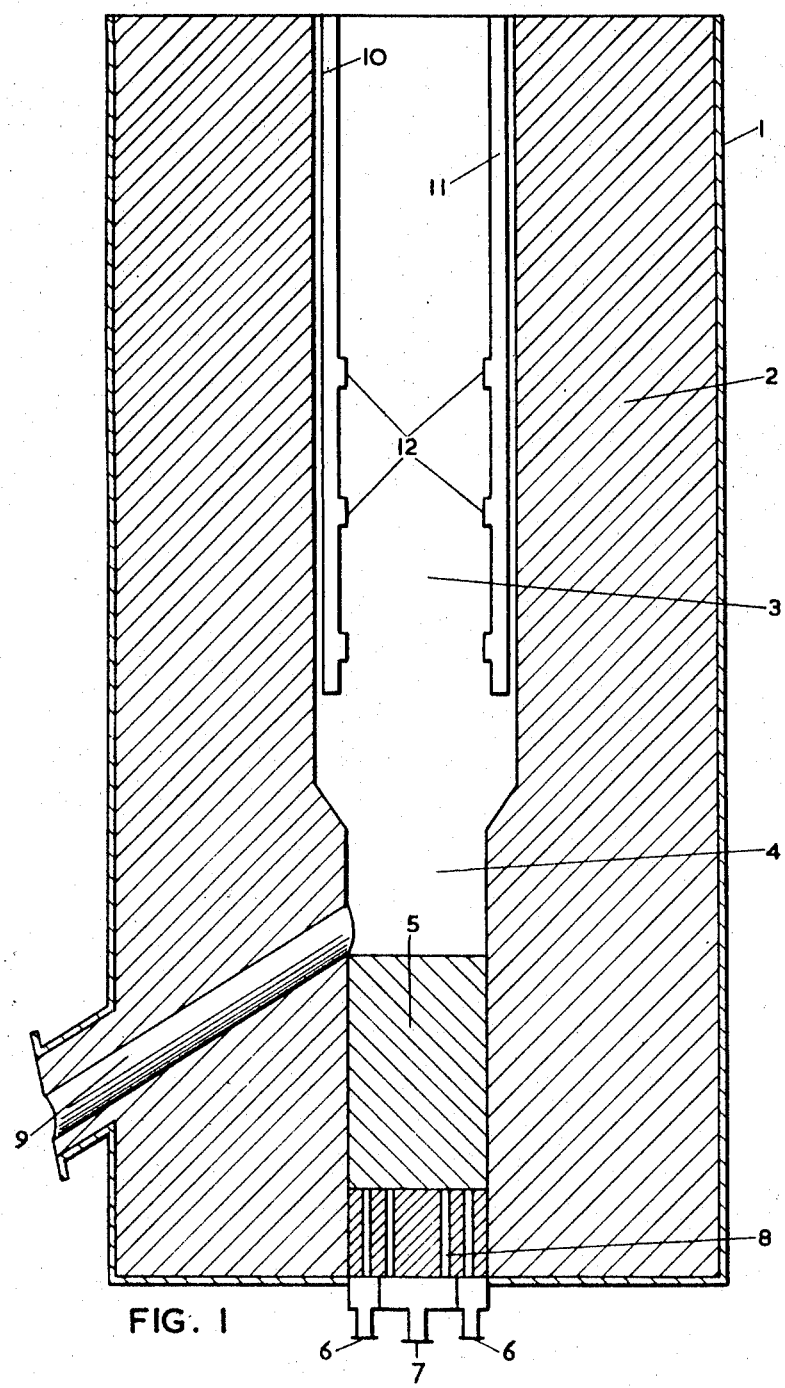

This application is a continuation-in-part of application Ser. No. 254,007, filed Jan. 25, 1963, now abandoned. Priority is claimed from British application 3,528/62, filed Jan. 30, 1962.

The present invention relates to a process for the production of finely divided pigmentary titanium dioxide by the vapor phase oxidation of a titanium tetrahalide.

It is known that finely divided pigmentary titanium dioxide can be produced by the oxidation in the vapor phase of a titanium tetrahalide, particularly titanium tetrachloride. Methods of carrying out such a process are described and claimed, for example, in U.S. Patents 2,828,187 and 3,043,657.

It is an object of the present invention to provide an improved process for the production of such finely divided pigmentary titanium dioxide by the oxidation, in the vapor phase, of a titanium tetrahalide.

Accordingly, the present invention is a process for the production of a finely divided pigmentary titanium dioxide which comprises passing into a reaction zone a stream of hot gas containing initial solid metal oxide particles of smaller average particle size than that of the titanium dioxide to be produced; introducing into the reaction zone a titanium tetrahalide and an oxygenating gas, at least one of these reactants being introduced through at least two inlets spaced laterally along the reaction zone in the direction of gas flow, the gas in the reaction zone being maintained at such a temperature that the tetrahalide and oxygenating gas react to form titanium dioxide, and thereafter recovering finely divided titanium dioxide from the reaction zone.

It is preferred that *both* the titanium tetrahalide and oxygenating gas be introduced through at least two inlets spaced laterally along the reaction zone. It is, however, contemplated to add sufficient of one of the reactants, as a single addition, to react with at least two subsequent additions of the other reactant to the gas stream.

Such a single addition may, for example, be made to the gas stream carrying the initial solid metal oxide particles before it enters the reaction zone, the other reactant being introduced into the reaction zone through at least two inlets spaced laterally along the zone in the direction of gas flow.

The single introduction of one of the reactants in this manner suffers from the disadvantage that the reactant introduced as a single addition requires a substantial amount of heat to raise it to reaction temperature.

Alternatively, the hot gas stream entering the reaction zone may already contain part or all of one of the reactants in the form of unreacted reactant from the preparation of the initial solid metal oxide particles by the oxidation of the corresponding metal halide.

The direction of flow of the reactant or reactants introduced through the inlets spaced laterally along the reaction zone may be at any angle to the axis of the hot gas stream passing through the reaction zone but it is preferred to introduce the reactant(s) at right angles to the gas flow. Introduction at an angle opposing the gas flow may, however, be advantageous in that it increases turbulence in the reaction zone and thus the rate of the reaction.

The process of the present invention is particularly suitable for the oxidation of titanium tetracholoride in the reaction zone with oxygen or a free-oxygen-containing gas, such as air or oxygen-enriched air, to form pigmentary titanium dioxide of high quality.

Normally, the initial solid metal oxide particles will be composed of titanium dioxide produced by the oxidation of a titanium tetrahalide, preferably titanium tetrachloride, although they may, if desired, consist of other metal oxides, for example other white metal oxides such as alumnia, zirconia and/or silica.

These initial metal oxide particles, which are believed to act an nuclei for the subsequent formation of titanium dioxide in the reaction zone, should be of smaller average particle size than the oxide particles subsequently withdrawn from the reaction zone.

The hot gas stream carrying the initial metal oxide particles should be inert to the metal oxide particles and to the titanium dioxide produced at the temperature existing in the process, in the sense that it should not have a deleterious effect upon these oxides, for example upon their particle size and/or colour and, particularly, it should have no deleterious effect upon the pigmentary properties of the titanium dioxide particles produced.

The hot gas stream carrying the initial metal oxide particles may contain, for example, gases such as oxygen, argon, nitrogen, chlorine, carbon dioxide or carbon monoxide.

This hot gas stream may be formed by any suitable method.

One suitable method for producing such particles is by the vapor phase oxidation of the appropriate metal halide in a fluidized bed or in an empty or unobstructed chamber reactor.

When preparing titanium dioxide pigment by the present process, it is advisable to control the reaction conditions for the formation of the initial metal oxide particles in such a manner as to limit the size of the latter particles. One method of limiting the particle size of the initial metal oxide particles is by oxidizing the metal halide (particularly titanium tetrachloride) in the presence of potassium, rubidium or caesium, ether alone or with zinc, cadmium, lead, antimony, molybdenum or thorium. A potassium salt such as potassium chloride may conveniently be used as a source of potasium ions for such a purpose.

Oxidation in the presence of an aluminum halide, such as aluminum tribromide and/or aluminum trichloride, may also be used to provide initial metal oxide particles of suitable size.

Another method of limiting the size of the initial oxide particles is to oxidise the metal halide in the presence of a large excess of oxygen and/or to ensure a fast reaction by other means.

Another method of forming hot gas stream containing the initial metal oxide particles is by the hydrolysis of the corresponding metal halide in such a manner as to produce initial metal oxide particles of the desired size. Methods for obtaining small metal oxide particles by this method have been described, for example, in U.S. Patent 3,078,148.

A further method for the production of small metal oxide particles is by the vaporization of a solid metal oxide, for example in a gas plasma produced by passing the gas through an electric discharge and the subsequent condensation of the vapour in, or adjacent, the reaction zone to the desired particle size.

The preferred method for the production of a hot gas stream containing initial metal oxide particles is by the introduction of a suitable metal halide such as titanium tetrachloride into an oxygen stream which has been heated to form a plasma by passage through an electric discharge. Such a process is described, for example in U.S. application Ser. No. 256,386.

The hot gases from such process containing the initial metal oxide particles are preferably passed immediately into the reaction zone.

The average particle size of the initial metal oxide in the stream of hot gas passing into the reaction zone may vary providing it is of smaller average particle size than that of the titanium dioxide particles to be produced.

It is possible that particles of the smallest size which can at present be detected may provide acceptable nuclei, for example particles have an average particle size as small as 0.001 micron, but it is preferred that the initial metal oxide particles have an average particle size in the range of 0.01 micron to 0.25 micron, particularly in the range 0.1 micron to 0.2 micron. The pigmentary particle size range of titanium dioxide is generally deemed to be 0.15 micron to about 0.35 micron.

The process of the present invention is also applicable to the production of titanium dioxide for special purposes, for example for use in the preparation of vitreous enamels or electroceramics where the average particle size of the material is preferably greater than 0.35 micron and in this case nuclei of greater size than those mentioned above can be used.

Average particle sizes referred to in this specification are average *weight* particle sizes, i.e., particle sizes at which there are equal *weights* of particles above and below the specified size.

Unless auxiliary heat is provided in the reaction zone, the stream of hot gas containing the initial metal oxide particles entering the reaction zone should be at least at a temperature at which the titanium tetrahalide and oxygenating gas in the reaction zone will react rapidly to form titanium dioxide. Where no auxiliary heat is supplied to the reaction zone the hot gas stream should enter the reaction zone at a temperature of at least 600° C. and preferably at a temperature of at least 800° C.

It is preferred to maintain the temperature in the reaction zone in the range 800–1600° C. and especially in the range 900–1500° C. and to introduce the hot gas stream containing the initial metal oxide particles into the reaction zone at a temperature in this range.

The oxygenating gas which is introduced into the reaction zone is a gas which rapidly oxidizes the titanium tetrahalide to titanium dioxide. It is preferably oxygen, which may contain another gas, for example as air or oxygen-enriched air.

In the preferred method of introducing the titanium tetrahalide and oxygenating gas into the reaction zone, i.e., when *both* reactants are introduced through at least two inlets spaced along the reaction zone, they may be premixed before introduction, provided they are not preheated to such an extent that they will react before introduction into the reaction zone.

They may, however, be introduced separately, i.e., not premixed, if desired. If introduced separately they may be injected into the reaction zone through inlets which are spaced at similar distances along the reaction zone or through inlets which alternate along the zone.

The titanium tetrahalide and oxygenating gas can be introduced through the walls of the reaction zone or they can be introduced through a pipe or pipes within it, for example through a pipe or pipes aligned laterally along the zone and which is provided with inlets along its length.

It is desirable to introduce the reactants in such a manner to cause rapid mixing of the titanium tetrahalide and oxidizing gas and they are preferably introduced with sufficient velocity and in such a direction to achieve this. The introduction of titanium tetrahalide and oxygenating gas into the reaction zone, unless they are fully preheated to the reaction temperature, will cause an initial drop in the temperature of the gas stream in the reaction zone but the subsequent oxidation of the titanium tetrahalide by the oxygenating gas will raise the temperature of the gas stream once more, since this reaction is exothermic, and the temperature of the gas stream will then be at least maintained until the next introduction of titanium tetrahalide and oxygenating gas when the process will be repeated. This results in a substantially autothermal process, at least within the reaction zone, which is the preferred method of carrying out the invention. It is, of course, necessary in such an autothermal process to ensure that the temperature of the gas stream passing through the reaction zone does not drop below a value at which the titanium tetrahalide and oxygenating gas will react or the temperature-maintaining series of reactions will be interrupted and to do this it is desirable to carry out the process on a sufficiently large scale and with a suitably small heat loss from the reaction zone.

It is also desirable that substantially all the reactant or reactants introduced into the gas stream in the reaction zone through one inlet reacts completely before that portion of the gas stream reaches the next inlet into the reaction zone where another introduction of that reactant or reactants is made. This can be ensured, for example, by controlling the velocity of the gas stream through the reaction zone, the distance between inlets and/or the amount of reactants introduced through each inlet.

It is, however, within the scope of this invention that the gas stream through the reaction zone is maintained at a temperature at which the titanium tetrahalide and oxygenating gas react to form titanium dioxide by supplying heat from other sources, for example, by burning a fuel within the reaction zone at an appropriate point or points, although this is not preferred.

It may also be possible to produce the hot gas stream containing the initial metal oxide particles by autothermal operation, for example by the oxidation of the corresponding metal halide in a fluidized bed of inert particles on a sufficiently large scale, for example, in accordance with the process described and claimed in U.S. Patents 3,043,657, 3,188,173 and 3,043,656. Under these circumstances, it is possible to carry out the whole process in an autothermal manner.

By autothermal operation in this specification is meant maintenance of the reaction temperature without the introduction of heat from an outside source once the process is in operation, apart from any preheating of the reactants in order to maintain them in the vapor phase.

It is desirable that as little flocculation of the initial metal oxide particles as possible occurs in the reaction zone, and this may be assisted by the rapid mixing of the reactants and/or by ensuring that the initial metal oxide particles are introduced into the reaction zone as soon as possible after their formation, preferably within one second or less. It may also be advantageous to introduce a deflocculating agent into the reaction zone.

In accordance with the invention there must be at least two inlets for the titanium tetrahalide and/or oxygenating gas into the reaction zone spaced laterally along the reaction zone in the direction of gas flow, and it is envisaged that at least three or four such inlets and up to 10 or 20 or more may be utilized to give titanium dioxide pigment of the best quality.

The optimum number of inlets for reactant(s) into the reaction zone will depend upon several factors, for example upon the average particle size of the initial metal oxide particles introduced into the reaction zone, the amount of titanium tetrahalide and/or oxidizing gas introduced through each inlet and the desired average particle size of the end product.

The amount of reactant(s) added through each inlet(s) at the same level in the reaction zone is suitably such that, when reacted the weight of titanium dioxide formed by that reaction is from 0.01 to 10 and preferably from 0.10 to 2 times, the total amount of oxide formed upstream (including the initial metal oxide).

It appears that in the production of titanium dioxide pigment the initial metal oxide particles can receive successive depositions of titanium dioxide until a product is obtained having excellent pigmentary properties.

For example, a titanium dioxide pigment for use in paints can be obtained which has high tinting strength, high rutile content and very uniform particle size.

Alternatively, smaller amounts of reactants may be introduced through each inlet and/or fewer inlets may be provided to produce titanium dioxide of smaller average particle size, for example in the range $0.15\mu$ to $0.20\mu$, which has a very uniform particle size and is particularly suitable for use in floor covering, tiles, etc., where high brightness and covering power at low pigment volume concentration is normally required.

Again, titanium oxide particles of very uniform particle size can be made having an average particle size substantially greater than that of the normal range of titanium dioxide pigments, for example for use in the preparation of vitreous enamels or ceramics.

In addition to the introduction of the titanium tetrahalide and oxygenating gas into the reaction zone, it may also be desirable to introduce other substances. For example, minor proportions of aluminum halide, silicon halide and/or water vapor may be introduced in order to modify the properties of the resulting titanium dioxide pigment.

Substances giving rise to coatings on the surface of the titanium dioxide particles may also be made through the last inlet(s) before the pigment leaves the reaction zone, for example inorganic materials such as silicon, titanium and/or zirconium tetrahalides and/or aluminum trihalide may be so introduced to produce the corresponding oxides on the pigment particles.

The reaction zone will normally be an unobstructed space such as an open chamber. If the initial metal oxide particles are produced in a fluidized bed, the reaction zone is suitably the space above the fluidized bed.

The titanium dioxide is desirably recovered from the reaction zone when it has the required properties for a particular purpose, for example high tinting strength and/or an appropriate particle size and/or the required coating(s).

The product may be recovered by any suitable method, for example the gas containing the finely divided titanium dioxide leaving the reaction zone can be cooled and passed through filters to recover the oxide. The gas passing the filters will contain a halogen, for example chlorine, from the oxidation of the titanium tetrahalide and this can be recovered by known means, for example by liquefaction.

The previously known processes for the production of finely divided metal oxides, by oxidation of corresponding halides in the vapor phase, suffer from certain disadvantages. For example, in the so-called "burner" process (in which the oxidation is carried out by a single introduction of each reactant in a chamber at a point remote from solid surfaces), it is difficult, if not impossible, to recover any heat of reaction since this is carried from the reaction chamber in the reactants and reaction products. Since the reactants must be heated to temperatures above 600° C., and preferably above 800° C. in order to react, it is necessary to raise the whole of the reactants to this temperature either by external preheating, or by burning a pure fuel such as carbon monoxide in the reaction zone. Since the reactants and reaction products are extremely corrosive at such temperatures, it is a complex and expansive process to inject the required amount of heat to maintain the reaction.

Some of these difficulties may be overcome by carrying out the reaction in a fluidized bed where inert bed particles retain the heat of reaction and preheat the reactants entering the bed thereby sustaining the reaction.

In this process, however, a substantial proportion of the product oxide, e.g., up to 30%–40% is retained in the bed as an accretion on the bed particles and this accretion is very difficult to recover in pigmentary form. This leads to a very substantial increase in the cost of producing the pigment and has seriously hindered the commercial use of the fluidized bed process.

By contrast, in the process of this invention, even if the initial metal oxide particles are produced in a burner or in a fluidized bed, less than 25%, and possibly less than 10%, of the total reactants need be formed in the bed or passed through the burner and the heat in the reaction products is passed into the reaction zone where it is utilized to sustain the oxidation of the titanium tetrahalide in the reaction zone. Thus, the reactant(s) in the present process which are introduced into the reaction zone through two or more inlets do not require preheating (other than to maintain them in the vapor state), and by the particular manner of their introduction, do not reduce the temperature in the reaction zone below that at which the titanium tetrahalide is oxidized to titanium dioxide, thereby avoiding the necessity of supplying large quantities of heat to the reaction zone.

Furthermore, because only a proportion of the total oxide produced is formed in a fluidized bed (when the latter is used to produce initial metal oxide particles) only a pro rata proportion of the oxide is lost as an accretion on the bed particles, e.g., less than 25% or even less than 10% of the amount lost by processes in which the whole of the reactants are introduced through the fluidized bed.

Other important advantages which accrue to this process are (a) The method of stepwise addition of reactants results in a product of more uniform particle size than may be achieved in a single stage process, and thus a higher quality pigment is obtained, and (b) The average particle size of the pigment can be readily varied by the number and/or amount of the introduction to obtain optimum performance in special applications.

It has also been found that the process of the present invention requires less pigment modifying additives (such as $AlCl_3$ and/or $SiCl_4$) based on the amount of $TiO_2$ produced, particularly when the initial metal oxide particles consist of $TiO_2$. This is due to the fact that once the effect of these additives has been exerted on the initial metal oxide particles )which form only a proportion of the total $TiO_2$ produced) at the usual $TiO_2$/additive ratios, there is no necessity to make further additions, e.g., to the reaction zone, since the effect of the earlier additions is maintained on the titanium dioxide produced in the reaction zone.

By making a number of smaller introductions of titanium dioxide and/or of oxidizing gas into the hot gas stream containing initial metal oxide particles rather than a single large introduction, it is possible to form substantially more titanium dioxide upon the initial metal oxide particles without reducing the temperature of the gas stream containing the initial metal oxide particles to a value below that at which the titanium tetrahalide is oxidized to titanium dioxide.

If a single large addition of titanium tetrahalide and/or oxidizing gas is to be made the addition(s) will require much greater preheating of the reactants and/or of the gas stream into which the addition is made if the temperature is to be maintained above reaction temperature during the addition of the reactants in the reaction zone.

A further marked disadvantage of the use of a single introduction of titanium tetrahalide and/or oxidizing gas into the reaction zone is, that where the amount of such introduction(s) is sufficiently large to form an acceptable amount of titanium dioxide, it causes excessive chilling of the gas stream passing through the reaction zone (even where it does not reduce the temperature of the gas to below that at which the tetrahalide is oxidized) and such chilling leads to an undesirable flocculation of the oxide particles in the reaction zone.

Where such flocculation occurs the tinting strength and, what is at least equally important, the *undertone* of the pigmentary titanium dioxide deteriorates from blue to brown.

Where the undertone of the pigment deteriorates from blue to brown, the final pigment markedly lacks brightness.

By the term titanium tetrahalide used in this specification is meant titanium tetrachloride, titanium tetraiodide or titanium tetrabromide. Titanium tetrafluoride is unsuitable for use in the present process and is excluded from this definition. Of the titanium tetrahalides mentioned above, titanium tetrachloride is preferred.

It is convenient, when considering the relative amounts of initial metal oxide particles and the titanium dioxide formed in the reaction zone to refer to the concept of "injection ratio." By this term is meant the ratio $$\frac{\text{Amount of TiO}_2 \text{ formed in the reaction zone}}{\text{Amount of initial metal oxide introduced into the reaction zone}}$$

In the present invention, it is convenient to carry out the process at an injection ratio in the range of 0.2 to 100 and it is preferred to carry out the process at an injection ratio in the range 1 to 10, particularly one in the range of 1 to 5.

Figure 2:
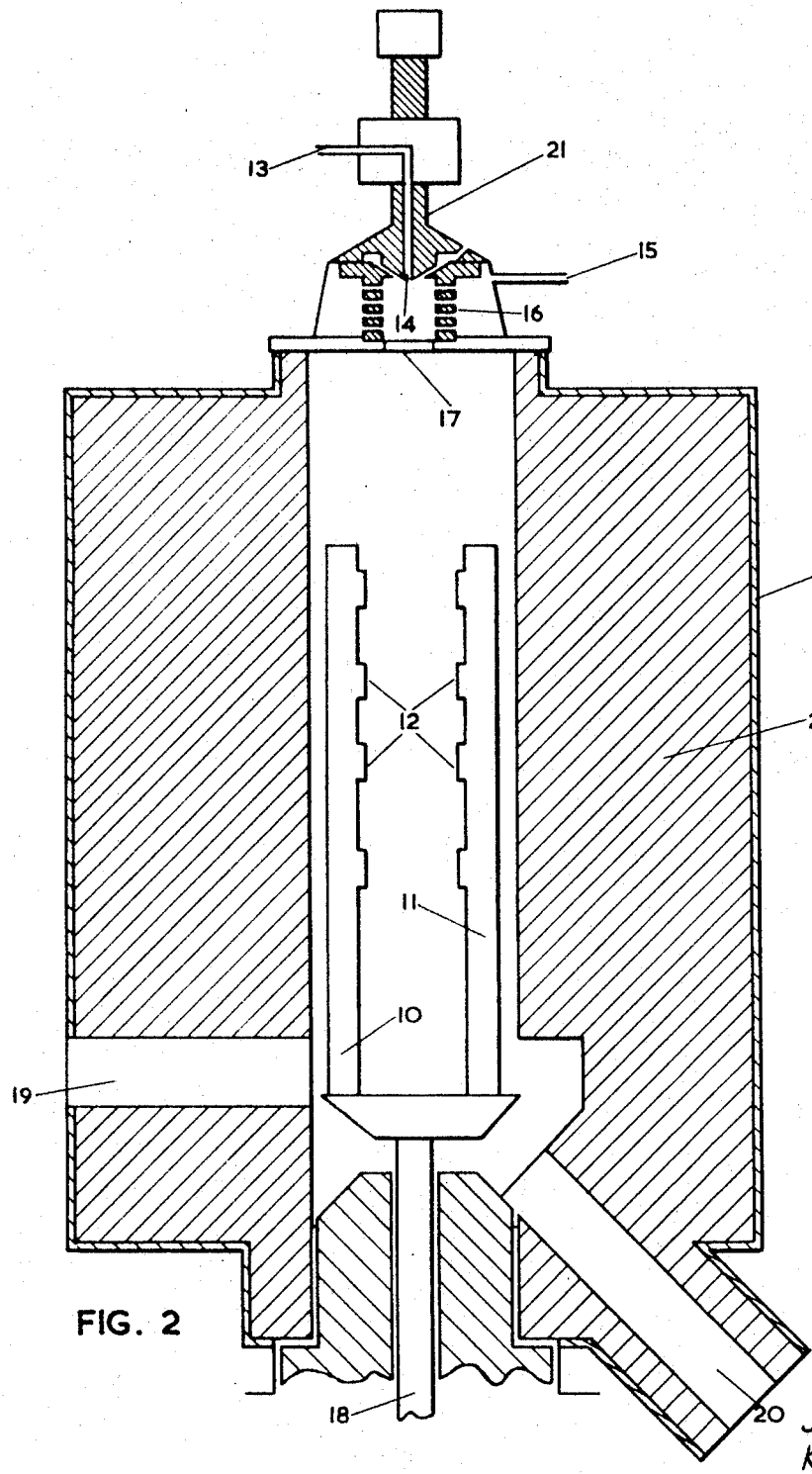

In the accompanying drawings, FIGURE 1 is a section through part of an apparatus for carrying out a process according to the present invention wherein a fluidized bed provides the hot gas stream carrying the initial metal oxide particles and FIGURE 2 is a section through an apparatus wherein the hot gas stream and initial metal oxide particles are formed by the use of a plasma gun.

The same numerals are used in FIGURES 1 and 2 for structures which are common to these figures.

FIGURE 1 shows a reactor shell 1 containing a chlorine-resistant refractory lining 2, the latter enclosing a reaction zone 3 and a lower portion 4 containing a fluidized bed 5 of inert particles which can be fluidized by gases (e.g. TiCl$_4$ and oxygen) introduced through conduits 6 and 7 and apertures in base plate 8.

Inclined shaft 9 is an overflow duct from the bed.

Within the reaction zone 3 are reactant supply pipes 10 and 11 which supply inlets 12 with premixed reactants (e.g., TiCl$_4$ and oxygen) at these levels. The supply pipes 10 and 11 are made of nickel and are cooled by air circulated within the pipe (but which does not enter the reaction zone).

The products from the reaction zone are withdrawn through a duct (not shown) in the top of the reactor.

FIGURE 2 shows a reactor shell 1 with chlorine-resistant refractory lining 2.

Placed on top of reaction zone 3 is a plasma gun 21 adapted to heat oxygen supplied through conduit 13 by passage through an electric discharge between electrodes in the gun (not shown).

The heated gas plasma issues from orifice 14 and premixed reactants (e.g., TiCl$_4$ and oxygen) are introduced into the plasma through conduit 15 and orifices 16, thereby reacting to form the initial metal oxide particles in hot gas stream entering the reaction zone through port 17.

Premixed reactants (e.g., titanium tetrachloride and oxygen) are introduced into the reaction zone at four levels via common supply duct 18, supply pipes 10 and 11 and inlets 12.

The supply pipes are made of nickel and cooled as described in FIGURE 1.

Titanium dioxide product is withdrawn via discharge port 19 and any coarse particles which form in the reaction zone and fall to the bottom are withdrawn periodically through discharge duct 20.

The following examples show embodiments of the present invention. Examples 1, 4 and 11 are processes not according to the present invention and are for purposes of comparisons.

EXAMPLE 1

A silica tube (3″ internal diameter and 48″ in length) was mounted vertically and surrounded by an electric furnace. The tube contained a bed of particles to be fluidized as described below. The tube was sealed at the bottom with a silica disc through which passed two silica inlet pipes.

One inlet pipe was connected to a source of oxygen and aluminum trichloride vapor and the other to a source of titanium tetrachloride and silicon tetrachloride vapor, and provision was made at the top of the silica tube to collect the titanium dioxide produced and to pass the effluent gases to a scrubbing tower. A sheathed thermocouple projected into the fluidized bed.

Dense titanium dioxide particles (1740 g.) of particle size −44 +72 (British Standard Sieve), slurried with 17.5 g. potassium chloride in aqueous solution and dried at 120° C., were introduced into the silica tube to form a static bed. The electric furnace was then switched on and the bed fluidized with air until it reached a temperature of 1050° C. The flow of air was then stopped and oxygen introduced through one inlet pipe at a rate of 18 litres per minute (measured at room temperature). The oxygen contained sufficient aluminum trichloride vapor to give 3% of alumina (by weight of the titanium dioxide produced).

Titanium tetrachloride vapor preheated to a temperature of 200° C. was introduced through the other inlet pipe at a rate equivalent to 55 ml./min. of liquid titanium tetrachloride. The titanium tetrachloride vapor contained 0.3% w./w. of silicon tetrachloride vapor.

The process was continued for 30 minutes. The pigmentary size titanium dioxide obtained from the exit gases was of good pigmentary quality and had a rutile content of 97.9%; a tinting strength on the Reynolds' scale of 1440; a mean weight crystal size of 0.138 micron and a standard deviation of 1.577. Of the titanium tetrachloride admitted to the bed, 30% was retained on the bed as titanium dioxide accretion.

The standard deviation is derived from the curve obtained when the particle size of the product (in microns) is plotted against the weight percentage of the product which is less than a given particle size. The former value is expressed on a logarithmic scale and the latter value on a probability scale. The standard deviation is the ratio between the particle size at 84% and that at 50%.

EXAMPLE 2

The process described in Example 1 was repeated but further quantities of titanium tetrachloride and oxygen were passed into the reactor by means of two injectors, which were introduced through the top of the silica tube and projected into the space above the fluidized bed. Each injector consisted of a silica pipe 6 mm. in internal diameter, sealed at the bottom end and with two 4 mm. holes drilled in it so that the holes are 15″ and 24″ from the base of the silica tube. One injector was connected to a source of titanium tetrachloride vapor and the other to a source of oxygen.

At the start of the experiment titanium tetrachloride vapor preheated to a temperature of 200° C. was passed into one injector at a rate equivalent to 55 ml./min. of liquid titanium tetrachloride, and oxygen was passed into the other injector at a rate of 18 liters per minute (measured at room temperature). The total flow rate of titanium tetrachloride into the reactor tube was thus 110 ml./min. liquid titanium tetrachloride, and the total flow rate of oxygen was 36 liters/min.

The titanium dioxide collected from the exit gases had excellent pigmentary properties with a tinting strength of 1680 on the Reynolds' scale; a rutile content of 99.1%; a mean crystal size of 0.188 micron and a standard deviation of 1.490.

The bed material was found to have retained only 17.0% of the total amount of titanium tetrachloride passed into the reactor as an accretion of titanium dioxide on the bed particles.

EXAMPLE 3

The process described in Example 2 was repeated but the amount of titanium tetrachloride vapor passed into the space above the fluidized bed was increased to the equivalent of 110 ml./min. liquid titanium tetrachloride, and the amount of oxygen was increased to 36 liters/min. The total flow of titanium tetrachloride into the reactor was thus equivalent to 165 ml./min. liquid titanium tetrachloride, and the total flow rate of oxygen was 54 liters/min.

The titanium dioxide collected from the exit gases had excellent pigmentary properties with a tinting strength on the Reynolds' scale of 1700; a rutile content of 99.5%; a mean weight crystal size of 0.26 micron and a standard deviation of 1.30.

The bed material was found to have retained only 14% of the total amount of titanium tetrachloride passed into the reactor as an accretion of titanium dioxide on the bed particles.

EXAMPLE 4

The process described in Example 1 was repeated with the differences that (a) No potassium chloride was added to the bed particles (b) The flow rate of titanium tetrachloride through the bed was 27.5 ml./min. and that of oxygen 9 liters/min. (i.e., the flow rate of gases through bed was half that shown in Example 1).

The product had a tinting strength of 1540 on the Reynolds' scale; a mean weight crystal size of 0.18; and a standard deviation of 1.599 and a rutile content of 98.5%. Of the titanium dioxide produced, 40% was retained on the bed particles.

EXAMPLE 5

The process described in Example 4 was repeated, but further quantities of titanium tetrachloride and oxygen were passed into the reactor above the bed as described in Example 2; the amount of titanium tetrachloride so introduced was 55 cc./min. and the amount of oxygen 18 liters/min.

The titanium dioxide collected from the exit gas had excellent pigmentary properties, with a tinting strength on the Reynolds' scale of 1610; a rutile content of 99.2%; a mean weight crystal size of 0.256 and a standard deviation of 1.34. Of the titanium dioxide produced, only 18% was retained on the bed particles.

EXAMPLE 6

The process described in Example 1 was repeated to form the first stage of this example, except that the rate of introduction of oxygen was 9 liters per minute (instead of 18) and the rate of introduction of the titanium tetrachloride was 27.5 ml./min. of liquid titanium tetrachloride, instead of 55 ml./min. These reactants contained the same proportions of aluminum trichloride (in the oxygen) and silicone tetrachloride (in the titanium tetrachloride) as in Example 1.

Immediately these conditions had been established, further titanium tetrachloride vapor and oxygen were passed into the reactor by means of two injectors, which were introduced through the top of the silica tube and projected into the space above the fluidized bed. Each injector consisted of a silica pipe sealed at the bottom end, with six holes 2 mm. in diameter drilled in it at points spaced 2″ apart along its length. The further titanium tetrachloride vapor, preheated to a temperature of 200° C., was passed into one injector at a rate equivalent to 110 ml./min. of liquid titanium tetrachloride; this titanium tetrachloride, which was of course in the form of vapour, contained 2.2%, by weight, of aluminum trichloride vapor. The further oxygen was passed into the other injector at a rate of 36 liters per minute. The total flow rate of titanium tetrachloride into the reactor tube was thus 137.5 ml./min. (measured as liquid) and the total flow rate of oxygen was 45 liters/min.

The process was continued for 30 minutes.

The titanium dioxide collected from the exit gases had excellent pigmentary properties with a tinting strength of 1830 on the Reynolds' scale; a rutile content of 99.2%; a mean weight crystal size of 0.23 micron and a standard deviation of 1.45.

The bed material was found to have retained only 10.0% of the total amount of titanium tetrachloride passed into the reactor as an accretion of titanium dioxide on the bed particles.

EXAMPLE 7

A reactor was formed comprising a cylindrical steel shell 13 ft. long and 5 ft. internal diameter lined with chlorine-resisting concrete to give an internal diameter over the lower two-fifths of its length of 12 inches and over the remainder of 15 inches.

The base of the reactor was a perforated steel plate upon which was cast a block of chlorine-resistant concrete. This base had 10 perforations—3 inner perforations and 7 outer perforations. The inner three perforations each had a restricted orifice of $15/64$ inch and were supplied by a common manifold. Six of the outer seven perforations each had a restricted orifice of $9/16$ inch and were supplied by separate pipes from a common manifold. The seventh perforation had a similar restricted orifice but was supplied by an individually controlled pipe.

A duct was provided through a wall of the reactor about 30 inches above the base of the reactor and this extended downwardly at an angle 40°. This was to allow overflow from the bed and provision was also made to supply particles to the bed continuously as required.

The top of the reactor consisted of a removable steel plate on the underside of which was cast a layer of refractory concrete. The top was pierced by a tube carrying a flange to which could be fixed a tubular air-cooled nickel assembly which was long enough to project within about 53 inches of the base. This nickel assembly comprised a central duct through which premixed gases could be injected into the reactor at three levels; the lower level being about 1 inch above the end of the tube and the others at 10 inch intervals above the lowest level and an outer jacket through which compressed air could be circulated for cooling to minimize corrosion of the assembly.

About 150 lbs. of titanium dioxide particles of an average size of about 300 microns were put into the reactor to form a bed and the top of the reactor was then put into position (without the nickel assembly). The bed was then fluidized by air passed through the inner perforations in the base of the reactor while the bed was heated to about 1100° C. by means of a gas poker. The poker was then removed and the nickel assembly was fixed to the underside of the top of the reactor and the top of the reactor replaced.

Oxygen (10 cu. ft./min.) preheated to 125° C. and containing aluminum chloride vapor (7 lbs./hour) was introduced through the six outer perforations in the base of the reactor and 8 cu. ft./min. of oxygen (without aluminum trichloride vapor) was introduced through the seventh outer perforation. The pressure drop across this perforation gives an indication of the depth of the bed.

The air was then discontinued and titanium tetrachloride vapor preheated to 150° C. and containing 0.12% silicon tetrachloride (as $SiO_2$ by weight on $TiO_2$ produced) was supplied through the three inner perforations at 3.5 lbs./min. In order to maintain the bed temperature at 1100° C., 4.5 lbs./hour of propane was added to the titanium tetrachloride stream and were burnt in the oxygen in the reactor.

A feed of about 20 lbs./hour of titanium dioxide particles of average particle size of about 150 microns and about 20 lbs./hour of titanium dioxide particles of average particle size of about 300 microns was supplied to the bed. The latter particles had been treated with sufficient aqueous potassium carbonate solution and thereafter heated to 1000° C. to provide about 0.1% by weight of $K_2O$ (on $TiO_2$ from the titanium tetrachloride supplied to the fluidized bed).

Through the air-cooled nickel assembly above the bed was then introduced a mixture of 5.1 lbs./min. of titanium in tetrachloride; 20 cu. ft./min. of oxygen and silicon tetrachloride in sufficient quantity to give 0.5% by weight of silica on the titanium dioxide formed from the titanium tetrachloride injected through the assembly. The temperature of this mixture was maintained at about 110° C.

The process was operated without difficulty for 37 hours before being closed down.

Titanium dioxide pigment was produced and collected and was found to have a rutile content of 96% and a tinting strength of 1800 (on the Reyonlds' scale). The amount of titanium dioxide formed as an accretion on the bed particles was only about 10% of the total titanium dioxide produced.

EXAMPLE 8

A reactor similar to that described in Example 7 was set up except that the internal diameter of the upper three-fifths of the reactor was 24 inches and the air-cooled nickel assembly was modified to allow 7 injections above the bed instead of three. As in Example 7, the injections were at 10 inch intervals.

Through the nickel assembly was introduced a gaseous mixture of 7 lbs./min. of titanium tetrachloride; 25 cu. ft./min. of oxygen and sufficient silicon tetrachloride to give 1% by weight of silica on the titanium dioxide produced from titanium tetrachloride injected above the bed.

The process was operated for 24 hours before closing down during which time titanium dioxide pigment having a rutile content of 90% and a tinting strength of 1740 (on the Reynolds' scale) was produced.

The titanium dioxide which formed as an accretion on the bed particles was only 9.7% of the total product.

EXAMPLE 9

The process was carried out as in the previous example but without the addition of silicon tetrachloride to the titanium tetrachloride/oxygen mixture introduced through the assembly.

The process was operated for 22 hours and gave titanium dioxide pigment having a rutile content of 99% and a tinting strength of 1550 (on the Reynolds' scale).

The titanium dioxide which formed as an accretion on the bed particles was only about 10.3% by weight of the total product.

EXAMPLE 10

A stream of hot gas was made by passing 25 liters per minute of argon through a device which heated it by means of an electric arc. The stream of hot gas was passed axially along a cylindrical chamber having three inlets in the form of coaxial annular slots spaced apart along the length of the cylinder.

Through the first slot was continuously introduced a mixture of 0.75 mole per minute of oxygen, 0.5 mole per minute of titanium tetrachloride and an amount of aluminum trichloride such as to yield 2% of aluminum oxide, by weight of the total amount of titanium dioxide formed in the process. The initial solid particles formed by this first step were carried along the cylinder in the stream of hot argon.

Through the second slot was continuously introduced a mixture similar to that of the first slot except that it contained no aluminum trichloride and contained an amount of silicon tetrachloride such as to yield 0.25% of silicon dioxide, by weight of the total amount of titanium dioxide formed in the process.

Through the third slot was continuously introduced a mixture similar to that of the first slot except that it contained no aluminum trichloride.

The final titanium dioxide pigment produced had a rutile content of 96.9% and a tinting strength of 1730 (on the Reynolds' scale).

EXAMPLE 11

The apparatus described in Example 1 was set up and dense titanium dioxide particles (1740 g.) of particle size −44 +72 (B.S.S.) were introduced into the silica tube to form a bed. The electric furnace was then switched on and the bed was fluidized with air until it reached a temperature of about 975° C. The flow of air into the bed was then slowly replaced by steam at a temperature of 150° C. through one inlet pipe and by vaporized titanium tetrachloride at 200° C. through the other inlet pipe.

The flow rate of the steam was 10 ml./min. (as water) and of the titanium tetrachloride 27.5 ml./min. (as liquid titanium tetrachloride).

The titanium dioxide pigment recovered from above the bed was of good pigmentary quality, having a rutile content of 99% and a tinting strength of 1680 (on the Reynolds' scale). The mean weight crystal size of the pigment was 0.17 micron. Of the titanium tetrachloride oxidized 35.8% was retained on the bed particles as titanium dioxide accretion.

EXAMPLE 12

The process described above in Example 11 was repeated in a similar apparatus but which had injectors situated above the fluid bed as described in Example 2.

The fluid bed was heated and steam and titanium tetrachloride vapour passed through the heated bed as described in the earlier part of this example.

Through one of the injectors above the bed was passed vaporized titanium tetrachloride at a rate of 55 ml./min. (as liquid $TiCl_4$) and through the other injector was passed oxygen at a flow rate of 18 l./min. (measured at N.T.P.).

The titanium dioxide collected from the exit gas was of excellent quality with a rutile content of 98.5% and a tinting strength of 1770 (on the Reynolds' scale). The pigment had a mean weight crystal size of 0.25 micron.

Of the total amount of titanium tetrachloride passed into the reactor, only 14.3% was retained on the bed particles as an accretion of titanium dioxide.

EXAMPLE 13

This experiment was carried out in a well insulated reactor of the type shown in FIGURE 1.

The reaction zone, forming the upper three fifths of the total length of the reactor, was 24" internal diameter and the lower part containing a fluidized bed of titanium dioxide particles was 12" internal diameter.

The two air cooled nickel injectors were provided with a variable number of inlets for reactants. The lower of these inlets was approximately 36" above the top of the fluidized bed and the remaining inlets were spaced equidistantly 10" apart along the reaction zone.

Titanium tetrachloride and oxygen were separately supplied to the fluidized bed in such a manner as to provide a hot gas stream entering the reaction zone at a temperature of 1100° C. and containing titanium dioxide particles of average means weight particle size of $0.17\mu$.

Premixed titanium tetrachloride vapor and oxygen preheated to 200° C. (to maintain the $TiCl_4$ in the vapor state) and in a molar ratio ($O_2/TiCl_4$) of 1.2 was introduced through the inlets into the reaction zone in such quantities as to give the injection ratios (as previously defined) noted below.

*Run 1.*—With an injection ratio of 2.1 and a single introduction of premixed titanium tetrachloride and oxygen, it was found impossible to operate the process for a process for a period longer than about 10 hours before the temperature in the second reaction zone fell below that necessary to maintain the reaction and the process ceased. Frequently this process failed within 1 hour.

*Run 2.*—With an injection ratio of 2.1 but with 3 introductions of premixed $TiCl_4/O_2$ along the second reaction zone, the process was operated for many days (and apparently could have operated indefinitely) without interruption.

*Run 3.*—With 4 introductions of $TiCl_4$ along the second reaction zone, the process was operated with apparent indefinite stability at an injection ratio of 2.9.

*Run 4.*—With 7 introductions of $TiCl_4/O_2$ along the reaction zone, the process was operated with apparent indefinite stability at an injection ratio of 4.3.

*Run 5.*—The process was operated for a short period (before failure) with a single introduction into the second reaction zone at an injection ratio of 2.1 (i.e., as in Run 1).

The pigmentary titanium dioxide produced during the period had a tinting strength (as estimated by Reynolds' Blue Method) of 1700.

The undertone of the final product was estimated by an experienced operator as brown, indicating a substantial degree of aggregation of the particles.

*Run 6.*—The process was operated with 3 introductions along the second reaction zone and at an injection ratio of 2.1.

The pigmentary titanium dioxide thus produced had a tinting strength of 1710 and a blue undertone, indicating very little aggregation of the particles.

*Run 7.*—The process was operated with 4 introductions along the second reaction zone and, again, at an injection ratio of 2.1.

The pigmentary titanium dioxide produced had a tinting strength of 1780 and a slightly bluer undertone than that from Run 6, indicating even less aggregation than in that product from that run.

*Run 8.*—The process was operated with an injection ratio of 2.9, using 4 introductions along the second reaction zone. The tinting strength of the pigment was 1750 with undertone still blue.

EXAMPLE 14

This experiment was carried out in a reactor of the type shown in FIGURE 2 of the accompanying drawings.

Oxygen at a rate of 800 cu./ft. min. was supplied to the plasma gun and heated by passage through the electric discharge between the electrodes. The arc current was maintained at 80 amps.

This process was continued for 3 hours (to heat the reactor) after which premixed $TiCl_4$ (4 lbs./min.) and oxygen (20 cu. ft./min.) containing sufficient $AlCl_3$ to give 2% $Al_2O_3$ on the $TiO_2$ formed from the $TiCl_4$ was introduced through the surrounding orifices into the hot gas plasma issuing from the plasma gun.

This resulted in the production of a hot gas stream containing $TiO_2$ particles of mean weight size of $0.18\mu$.

After another hour premixed $TiCl_4$ (6 lbs./min.) and oxygen (12 cu. ft./min.) containing sufficient $SiCl_4$ to produce 0.5% by weight $SiO_2$ on the $TiO_2$ formed from the accompanying $TiCl_4$ was introduced into the reaction zone via the common supply duct, supply pipes and associated inlets.

The $TiO_2$ produced was recovered by means of filters from the gaseous suspension issuing from the discharge port.

The $TiO_2$ had a rutile content of at least 98%, a tinting strength of 1750 and was of exceptionally good brightness and color.

The product had an average mean weight particle size of $0.25\mu$.

As previously noted in this specification it is advisable, where the titanium tetrahalide and oxidizing gas are premixed before introduction into the reaction zone, not to preheat the premixed reactants to a temperature at which they will react before their introduction into the reaction zone. Consequently, under these circumstances the premixed reactants should be preheated to a temperature below 600° C. and preferably to a temperature below 350° C.

What is claimed is:

1. In a process comprising reacting titanium tetrahalide vapor with an oxygenating gas in the presence of initial metal oxide particles to form finely divided particles comprising said initial metal oxide particles having deposited thereon said titanium dioxide, the improvement which comprises the steps of:
    (a) forming a hot gaseous suspension comprising said initial metal oxide particles having an average mean weight particle size in the range of from about 0.001 up to 0.25 micron dispersed in a gas which is inert to said initial metal oxide particles and to titanium dioxide;
    (b) introducing said hot, gaseous suspension at a temperature of at least 600° C. into a reaction zone and effecting flow of said suspension therethrough;
    (c) effecting said reaction between titanium tetrahalide and oxygenating gas in said reaction zone in a plurality of stages, said stages being displaced from each other in said reaction zone in the direction of flow of said suspension through said reaction zone, the amount of titanium tetrahalide and oxygenating gas reacted in each stage being sufficient to provide an amount of titanium dioxide of from 0.01 to 10 times the weight of the suspended metal oxide particles fed to said stage;
    (d) maintaining said reaction zone at a temperature in the range of about 800° C. to 1600° C. during said reaction;
    (e) maintaining the overall ratio of titanium dioxide formed in said reaction zone to initial metal oxide introduced into said reaction zone in the range of 0.2 to 100; and
    (f) recovering from said reaction zone finely divided particles having greater average mean weight particle size than said initial metal oxide particles.

2. A process in accordance with claim 1, wherein said oxygenating gas and said titanium tetrahalide are injected into said hot gaseous suspension in each of said stages.

3. A process in accordance with claim 1, wherein said titanium tetrahalide and oxygenating gas are injected into said hot gaseous suspension at a temperature below reaction temperature.

4. A process in accordance with claim 1, wherein at least part of one of the reactants is injected into said hot gaseous suspension in one of said stages in an amount in excess of that required for complete reaction with the amount of the other of said reactants present at said stage and wherein at least part of said other reactants is injected in a subsequent stage which is free of injection of said one reactant.

5. A process as claimed in claim 1 wherein the initial metal oxide particles comprise an oxide selected from the group alumina, zirconia, silica, titanium dioxide and mixtures thereof.

6. A process as claimed in claim 1 wherein the hot gas stream containing dispersed initial metal oxide particles is formed by heating a gas by passage through an electric discharge and thereafter forming in the gas stream particles of a metal oxide.

7. A process as claimed in claim 1 wherein the hot gas stream containing dispersed initial metal oxide particles is formed by heating oxygen by passage through an electric discharge and thereafter reacting the hot gas with a metal halide.

8. A process as claimed in claim 1 wherein the hot gas stream containing dispersed initial metal oxide particles is formed by the oxidation of a metal halide vapor in a fluidized bed of solid particles.

9. A process as claimed in claim 1 wherein the initial metal oxide particles have an average particle size in the range 0.1 to 0.2 micron.

10. A process as claimed in claim 1 wherein the titanium dioxide particles recovered from the reaction zone have an average particle size in the range 0.15 to 0.35 micron.

11. A process as claimed in claim 1 wherein at least one of the reactants titanium tetrahalide and oxidizing gas is introduced into the reaction zone in 3 and 20 stages spaced along the reaction zone in the direction of gas flow.

12. A process as claimed in claim 1 wherein in addition to titanium tetrahalide and oxidizing gas compounds selected from the group consisting of aluminum trihalides, zirconium and silicon tetrahalides and water vapor are introduced into the reaction zone.

13. A process as claimed in claim 1 wherein the oxidizing gas is free oxygen.

14. A process as claimed in claim 1 wherein the titanium tetrahalide is titanium tetrachloride.

15. A process as claimed in claim 1 wherein the injection ratio is in the range 1 to 10.

16. A process as claimed in claim 1 wherein the injection ratio is in the range 1 to 5.

References Cited

UNITED STATES PATENTS

| 2,964,386 | 12/1960 | Evans et al. | 23—202 |
| 3,068,113 | 12/1962 | Strain et al. | 106—300 |
| 3,078,148 | 2/1963 | Belknap et al. | |
| 3,147,077 | 9/1964 | Callow et al. | |

EDWARD STERN, Primary Examiner

U.S. Cl. X.R.

106—300